(12) United States Patent
Leong et al.

(10) Patent No.: US 10,242,498 B1
(45) Date of Patent: Mar. 26, 2019

(54) PHYSICS BASED GARMENT SIMULATION SYSTEMS AND METHODS

(71) Applicant: STYLEME LIMITED, Hong Kong (CN)

(72) Inventors: Jonathan Zhan Hua Leong, Taipei (CN); Ying-Hung Chen, Santa Ana, CA (US); Tsung-Chih Tsai, New Taipei (CN)

(73) Assignee: STYLEME LIMITED, Hong Kong (CN)

( * ) Notice: Subject to any disclaimer, the term of this patent is extended or adjusted under 35 U.S.C. 154(b) by 0 days.

(21) Appl. No.: 15/806,256

(22) Filed: Nov. 7, 2017

(51) Int. Cl.
*G06T 17/20* (2006.01)

(52) U.S. Cl.
CPC ........ *G06T 17/205* (2013.01); *G06T 2210/16* (2013.01); *G06T 2210/21* (2013.01)

(58) Field of Classification Search
None
See application file for complete search history.

(56) References Cited

U.S. PATENT DOCUMENTS

| | | | |
|---|---|---|---|
| 6,546,309 | B1 | 4/2003 | Gazzuolo |
| 8,654,121 | B1 | 2/2014 | Yu et al. |
| 2009/0115777 | A1 | 5/2009 | Reyers Moreno |
| 2011/0298897 | A1 | 12/2011 | Sareen et al. |
| 2012/0062555 | A1 | 3/2012 | O'Connor et al. |
| 2012/0095589 | A1 | 4/2012 | Vapnik |
| 2013/0057544 | A1 | 3/2013 | Oh |
| 2014/0035913 | A1 | 2/2014 | Higgins et al. |
| 2014/0279289 | A1 | 9/2014 | Steerman |
| 2014/0368499 | A1 | 12/2014 | Kaur |
| 2015/0154691 | A1 | 6/2015 | Curry et al. |
| 2015/0269291 | A1 | 9/2015 | Sekine et al. |
| 2016/0063588 | A1 | 3/2016 | Gadre et al. |

(Continued)

FOREIGN PATENT DOCUMENTS

| | | |
|---|---|---|
| CN | 102567602 A | 7/2012 |
| CN | 202615450 U | 12/2012 |
| CN | 105427386 A | 3/2016 |

(Continued)

OTHER PUBLICATIONS

"Algorithm—Find Whether Two Triangles Intersect or Not," Stack Overflow, http://stackoverflow.com/questions/7113344/find-whether-two-triangles-intersect-or-not, printed Jan. 17, 2018. 2 pages.

(Continued)

*Primary Examiner* — Frank S Chen
(74) *Attorney, Agent, or Firm* — Duane Morris LLP; Manita Rawat (57) ABSTRACT

Systems and methods are provided for simulating the fitting of a deformable object, such as a garment onto a destination body shape over one or more time intervals. In some embodiments, the method generally includes simulating a deformable object's motion based on at least one material property of the deformable object and at least one external parameter. The method provides for detecting and handling collisions between the deformable object and at least one environmental object, between the deformable object and at least one kinematic object, and between the deformable object and itself. The method also provides for determining whether the simulation of the deformable object's motion has come to a rest state based on a velocity of the deformable object.

20 Claims, 7 Drawing Sheets

(56) References Cited

U.S. PATENT DOCUMENTS

2017/0161948 A1 6/2017 Hua et al.

FOREIGN PATENT DOCUMENTS

| CN | 105678838 A | 6/2016 |
|---|---|---|
| CN | 106096130 A | 11/2016 |
| KR | 10-2015-0097903 A | 8/2015 |
| WO | 2014-022608 A2 | 2/2014 |

OTHER PUBLICATIONS

Barnett, "Online clothes-shopping: Is an avatar the answer?," Feb. 29, 2012, http://www.theguardian.com/fashion/shortcusts/2012/feb/29/online-clothes-shopping-avatar. 3 pages.
Bartle et al., "Physics-driven Pattern Adjustment for Direct 3D Garment Editing," 2016, ACM Transactions on Graphics (ACM Siggraph 2016). 11 pages.
Ben-Chen et al., "Variational Harmonic Maps for Space Deformation," ACM Transactions on Graphics, 2009 (ACM Siggraph 2009). 11 pages.
Berthouzoz et al., "Parsing Sewing Patterns into 3D Garments," 2013, ACM Transactions on Graphics (ACM Siggraph 2013). 11 pages.
"Body Labs," https://www.bodylabs.com/, printed Jan. 17, 2017. 4 pages.
Botch et al., "On Linear Variational Surface Deformation Methods," IEEE TVCG 14, 1, 2008, pp. 213-230.
Botch et al., "Polygon Mesh Processing," 2010. 1 page.
"Bounding Volume," http://en.wikipedia.org/wiki/Bounding_volume, printed Jan. 17, 2017. 6 pages.
Brouet et al., "Design preserving Garment Transfer," 2012, (ACM Siggraph 2012). 12 pages.
"CLO 3D Fashion Design Software," http://clo3d.com/, printed Jan. 17, 2017. 1 page.
Decaudin et al., "Virtual Garments: A Fully Geometric Approach for Clothing Design," Eurographics, 2006, vol. 25, No. 3. 10 pages.
"Fashionme," Retrieved on May 13, 2016, http://cordis.europa.eu/project/ren/54101_en.html. 3 pages.
Hauswiesner et al., "Free Viewpoint Virtual Try-On With Commodity Depth Cameras," Retrieved on May 13, 2016, http://www.icg.tugraz.at/kinectclothpaper. 8 pages.
Hinderer et al., "A Platform for Fashion Shopping with individualized Avatars and Personalized Customer consulting," Apr. 12, 2016, Research Gate, pp. 1-7.
Khalil, "The 3D virtual environment online for real shopping," 2015, Computer Science and Information Technology Department, Computer Solution Center, arXiv:1512.02372. 7 pages.
Lipman et al., "Linear Rotation-invariant Coordinates for Meshes," ACM Transactions on Graphics, 2005. 9 pages.
Meng et al., "Flexible Shape Control for Automatic Resizing of Apparel Products," CAD 44, 2012, pp. 1-10. 10 pages.
Muller et al., "Air Meshes for Robust Collision Handling," 2015, ACM Transactions on Graphics (TOG)—Proceedings of ACM SIGGRAPH 2015, pp. 1-9. 9 pages.
"Optitex Fashion Design Software, 3D Virtual Photocopying," http://optitex.com/, printed Jan. 17, 2017. 5 pages.
PCT International Search Report and Written Opinion dated Nov. 29, 2017 in International Application No. PCT/IB2017/000968. 8 pages.
Randall, "Fashion ecommerce: are virtual fitting rooms the silver bullet?," Feb. 9, 2015, https://econsultancy.com/blog/66058-fashion-ecommerce-are-virtual-fitting-rooms-the-silver-bullet. 10 pages.
Sorkine et al., "As-Rigid-AS-Possible Surface Modeling," Proceedings of the Eurographics Symposium on Geometry Processing, 2007, pp. 109-116.
Sorkine et al., "Lapracian Surface Editing," Proceedings of the Eurographics Symposium on Geometry Grocessing, 2004, pp. 179-188.
Tang et al., "Fast Continuous Collision Detection Using Deforming Non-Penetration Filters," 2010, Proceedings of the 2010 ACM SIGGRAPH Symposium on Interactive 3D Graphics and Games. 7 pages.
Umetani et al., "Sensitive Couture for Interactive Garment Modeling and Editing," 2011, ACM Transactions on Graphics (ACM SIGGRAPH 2011). 11 pages.
Volino et al., "From Early Virtual Garment Simulation to Interactive Fashion Design," Computer-Aided Design 37, Sep. 15, 2004, pp. 593-608.
Zolfagharifard, "Is this the end of changing rooms? App creates a virtual reality fitting service for shoppers to 'try on' clothes," Jun. 17, 2015, Dailymail.com. 4 pages.

PHYSICS BASED GARMENT SIMULATION SYSTEMS AND METHODS

I. BACKGROUND

Physics based simulation has become an active research field in computer graphics and can play a prominent role in movies, video games, and other interactive applications. One particular area where such simulation has become prominent is the modeling and simulated fitting of garments or articles of clothing. Physics based simulation may be applied to modeling of complex cloth dynamics and motion, and can provide a realistic and natural simulation result.

At least some known cloth simulations involve modeling the cloth material properties by solving implicit or semi-implicit integration, and performing complicated collision handling and response. However, these methods can be computationally expensive. Further, when simulating an interactive virtual garment fitting, such methods may not be able to meet the requirements for high visual quality simulation, and/or may not perform adequately to provide an accurate simulation indicating whether the garment will actually fit on a destination body shape.

II. BRIEF DESCRIPTION

The embodiments described herein enable simulating the fitting of a deformable object, such as a garment, onto a destination body shape in order to provide a high visual quality, while also offering high performance and accuracy. For example, in one embodiment, a method for simulating the fitting of a deformable object over one or more time intervals is disclosed. At each time interval, the deformable object's motion is simulated based on at least one material property of the deformable object and at least one external parameter, wherein the deformable object is represented as a polygonal mesh. At least one collision between the deformable object and at least one environmental object is detected, wherein the environmental object is represented as a polygonal mesh. The collision between the deformable object and the environmental object is resolved. At least one potential collision between the deformable object and at least one kinematic object is detected, and a repulsive force is applied to the potential collision, wherein the kinematic object is represented as a polygonal mesh. At least one actual collision between the deformable object and the kinematic object is detected and a restitution impulse is applied to the actual collision. At least one remaining actual collision between the deformable object and the kinematic object is detected and resolved. The method also includes determining whether the simulation of the deformable object's motion has come to a rest state based on a velocity of the deformable object.

In other embodiments, a system for simulating the fitting of a deformable object over one or more time intervals is disclosed. The system comprises a computing device configured to, at each time interval, simulate the deformable object's motion based on at least one material property of the deformable object and at least one external parameter, wherein the deformable object is represented as a polygonal mesh. The computing device is further configured to detect at least one collision between the deformable object and at least one environmental object, wherein the environmental object is represented as a polygonal mesh, and resolve the collision between the deformable object and the environmental object. The computing device detects at least one potential collision between the deformable object and at least one kinematic object, and applies a repulsive force to the potential collision, wherein the kinematic object is represented as a polygonal mesh. The computing device detects at least one actual collision between the deformable object and the kinematic object and applies a restitution impulse to the actual collision. The computing device is further configured to detect at least one remaining actual collision and resolving the remaining actual collision before finally determining whether the simulation of the deformable object's motion has come to a rest based on a velocity of the deformable object.

In yet other embodiments, a non-transitory computer readable medium is disclosed, having instructions stored thereon for simulating the fitting of a deformable object over one or more time intervals. The instructions, when executed by a processor, cause a device to perform operations for such simulation. At each time interval, the device may simulate the deformable object's motion based on at least one material property of the deformable object and at least one external parameter, wherein the deformable object is represented as a polygonal mesh. The device detects at least one collision between the deformable object and at least one environmental object, wherein the environmental object is represented as a polygonal mesh. The device resolves the collision between the deformable object and the environmental object. The device detects at least one potential collision between the deformable object and at least one kinematic object, and applies a repulsive force to the potential collision, wherein the kinematic object is represented as a plurality of polygons. The device detects at least one actual collision between the deformable object and the kinematic object and applies a restitution impulse to the actual collision. The device detects at least one remaining actual collision and resolves the remaining actual collision. The device determines whether the simulation of the deformable object's motion has come to a rest based on a velocity of the deformable object.

IV. DETAILED DESCRIPTION

As described above, at least some known cloth simulation methods can be computationally expensive and may not be able to meet the requirements for high visual quality simulation, and/or may not perform adequately to provide an accurate simulation indicating whether a garment will actually fit on a destination body shape. The embodiments described herein enable the simulation of a garment fitting onto a destination body shape in order to provide a high visual quality, while also offering high performance accuracy. The embodiments described herein include, for example, simulation of a deformable object's motion based on at least one material property of the deformable object and at least one external parameter. The embodiments also include detection and handling of collisions between the deformable object and at least one environmental object, between the deformable object and at least one kinematic object, and between the deformable object and itself. The embodiments described herein also provide for a determination as to whether the simulation of the deformable object's motion has come to a rest state based on a velocity of the deformable object.

Figure 1:
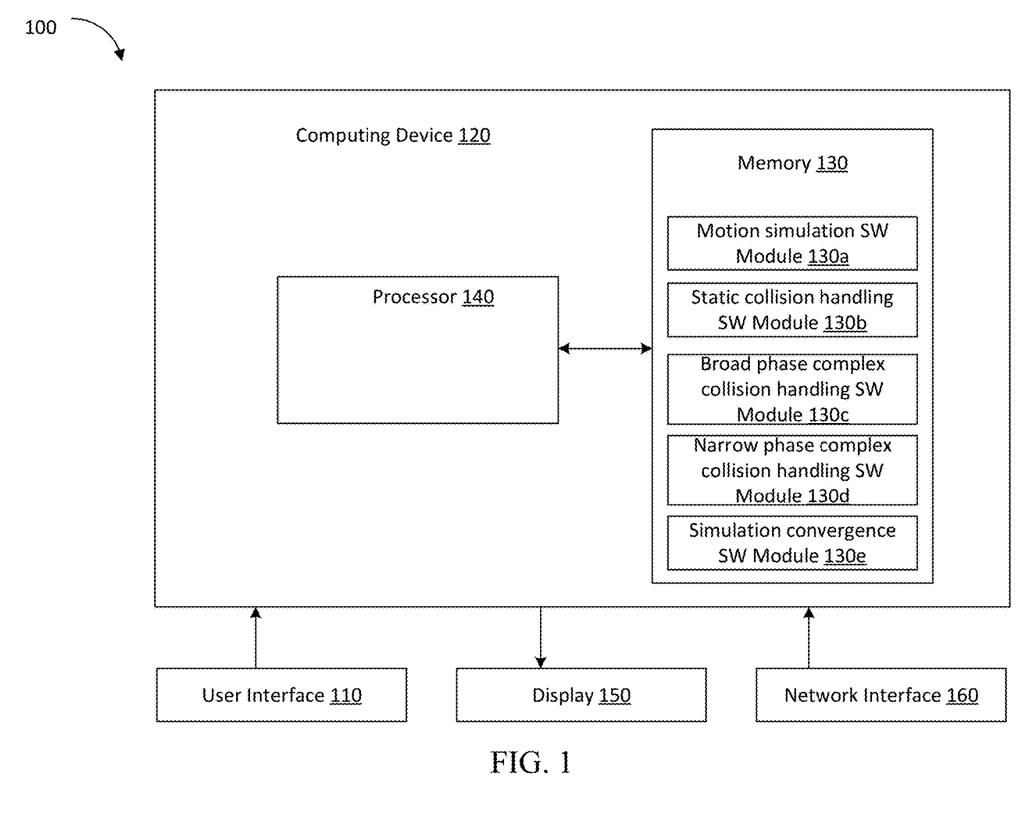
FIG. 1 is a block diagram of an exemplary system for simulating the fitting of a garment in accordance with some embodiments of the present disclosure.

FIG. 1 illustrates a functional block diagram of an example system 100 for simulating the fitting of a garment to a destination body shape. System 100 may include a user interface 110, a computing device 120, a display 150, and a network interface 160. Computing device 120 may include a memory 130, and a processor 140. In some examples, user interface 110, computing device 120, display 150, and network interface 160 may be embodied on a single device. In other examples, user interface 110, computing device 120, display 150, and network interface 160 may refer to two or more devices distributed over several physical locations, connected by one or more wired and/or wireless links.

User interface 110 may represent any electronic device or application on an electronic device configured to receive user input corresponding to one or more 3D polygonal meshes representing the shape of a deformable object, such as a garment (hereinafter "garment mesh"), one or more 3D polygonal meshes representing the shape of one or more kinematic objects, such as one or more bodies of various shapes (hereinafter "body mesh"), and one or more 3D polygonal meshes representing one or more environmental objects, such as a floor (hereinafter "environmental object mesh"). In addition, body meshes may be of two types: source body meshes representing a body shape on which a garment mesh was previously fitted, and destination body meshes representing a body shape on which the garment mesh is to be fitted. For purposes of the present disclosure, a garment mesh may be understood to mean a 3D representation of a garment. Garment meshes that are received represent a 3D polygonal mesh as fitted to a source body mesh. Sources of garment and body meshes may include any suitable source for capturing images, scanning materials, or any software that can be used to create the mesh. Sources may include, without being limited to, cameras, video recorders, 3D scanners, and digital authoring tools for 3D illustration. In addition, one or more types of meshes may be pre-stored (cached) in memory 130 prior to any simulation as discussed in more detail below and accessed via the user interface 110.

Figure 2A:
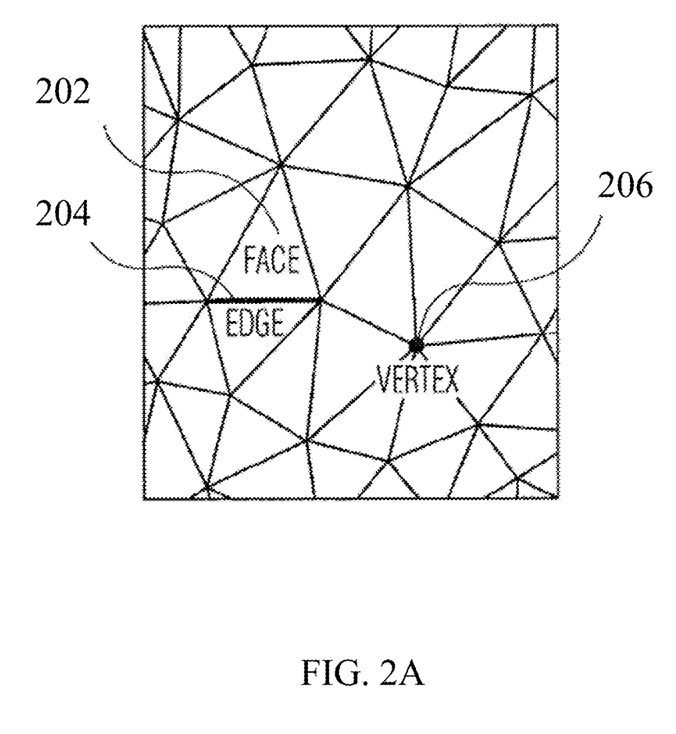
FIG. 2A is a zoomed in view of an exemplary three dimensional (3D) mesh representation of a garment in accordance with some embodiments of the present disclosure.
Figure 2B:
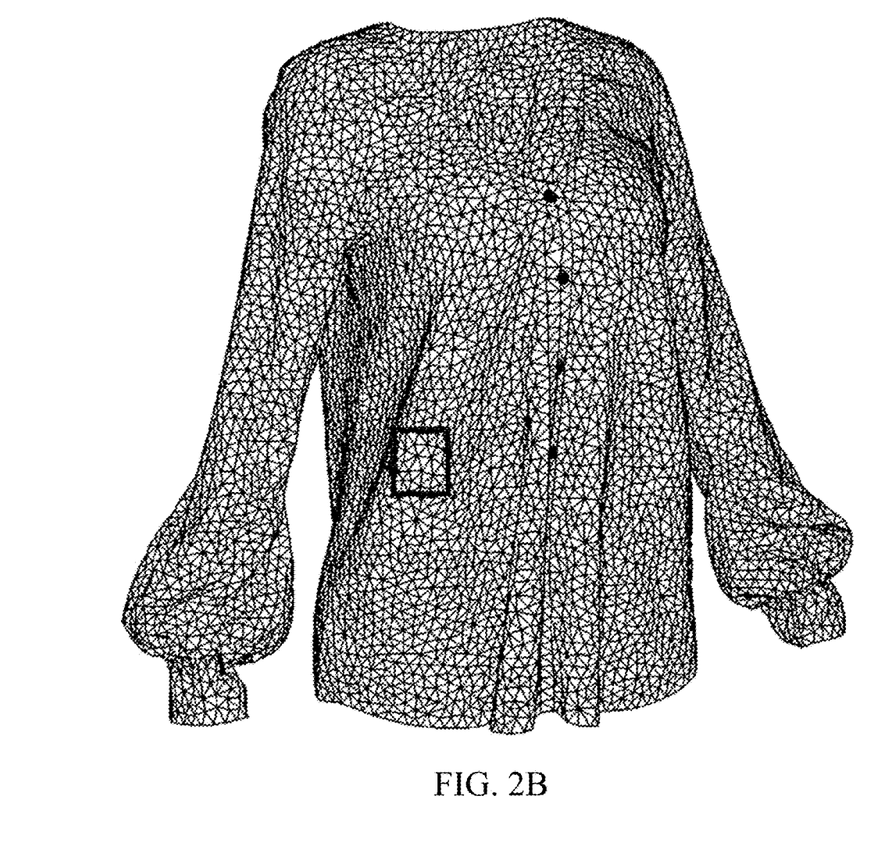
FIG. 2B is a perspective view of an exemplary 3D mesh representation of a garment in accordance with some embodiments of the present disclosure.
Figure 2C:
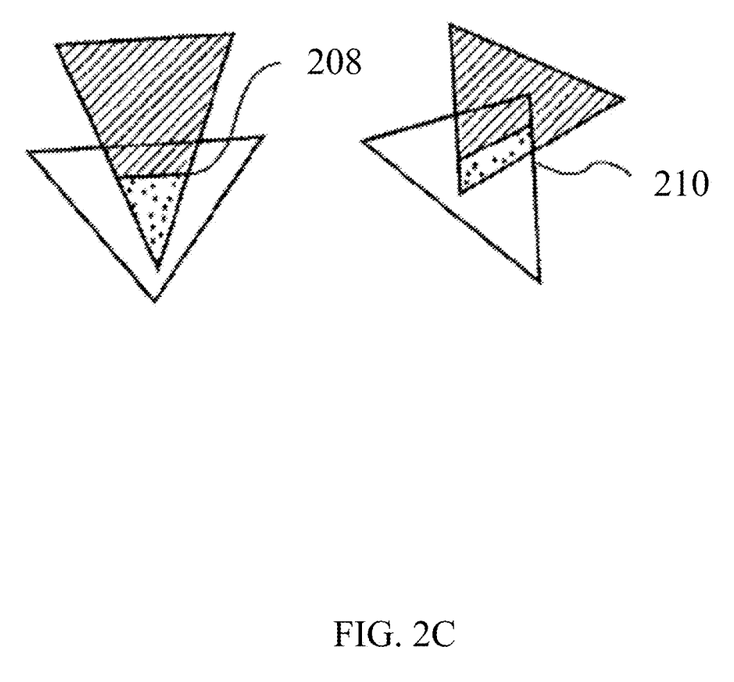
FIG. 2C is a perspective view of an exemplary collision between two faces from one or more 3D mesh representations in accordance with some embodiments of the present disclosure.

FIGS. 2A, 2B, and 2C illustrate various aspects of three-dimensional polygonal meshes which may be useful for understanding the description herein. Inputs to system 100 (shown in FIG. 1) may include one or more garment meshes, one or more body meshes, and one or more environmental meshes. As shown in FIG. 2A, a polygonal mesh refers to a collection of vertices 206, edges 204, and faces 202 that together approximate a three dimensional shape (e.g., the garment mesh as shown in FIG. 2B is in a geometric shape as if it is worn on a body). The shape may be induced from, for example, a prior cloth simulation, a 3D scan from real-world sources, created by 3D artists, or by any related methods. Similarly, the shape of a body mesh may be determined from a 3D scan of a physical body or may be directly created by 3D artists. The scanned body may be a real human body or an artificial mannequin. During a garment fitting simulation, the motion of garment meshes may be predicted based on the material properties of the garment as well as one or more external parameters. In addition, the motion of a body mesh on which the garment mesh is to be fitted may be simulated by interpolating between a source and destination body mesh. Thus, during such a simulation, the garment meshes, body meshes, and environmental object meshes may collide with each other or with themselves based, at least in part, on the predicted motion of the garment and body meshes.

An exemplary collision is illustrated in FIG. 2C, wherein if two faces intersect, then either two edges of one face intersect the other face (as shown in 208) or one edge of each face intersects the other (as shown in 210). In general, the meshes may be manifold polygonal triangle meshes represented in files of any suitable format, such as a standard data format (for example, Wavefront obj from Wavefront Technologies, a division of Autodesk). A garment mesh file may include associated information regarding the material properties of the garment, such as texture and material information, stretching, bending, structure, and thickness among other information. A garment mesh may also include garment information such as, without being limited to, one or more of a garment identifier, manufacturer, designer, store information, material information, rendering options, sizing information, layering order, and date. Non-triangle meshes may be converted into triangle meshes by any known suitable means, and non-manifold meshes may be converted into manifold meshes by any known suitable means. In some examples, when a received mesh is identified as being of poor quality (by a suitable quality metric), it may be remeshed by any known suitable method. In some examples, equipment may be used to capture information data that may be transformed to meshes through software.

Referring back to FIG. 1, computing device 120 may be configured to receive a garment mesh, a source body mesh (i.e., the body mesh to which the garment mesh is currently fitted), a destination body mesh (i.e. the body mesh to which the garment mesh is to be fitted), and at least one environmental object mesh from user interface 110. The embodiments of the present disclosure are described below in terms of triangle meshes, however this is for ease of illustration and a 3D mesh may be comprised of any suitable polygonal shape.

Referring back to FIG. 1, memory 130 may include a non-transitory computer-readable medium (e.g., one or more nonvolatile memory elements, such as EPROM, EEPROM, Flash memory, a hard drive, and so on) that may store at least the following software (SW) modules:

a motion simulation SW module 130a that is configured to simulate the motion of a garment mesh based on at least one material property of the garment mesh and at least one external parameter, while also performing a linear interpolation between the source body mesh and the destination body mesh, thereby generating an intermediate body mesh at each time interval of the simulation;

a static collision handling SW module 130b that is configured to detect collisions between the garment mesh and at least one environmental mesh;

a broad phase collision handling SW module 130c that is configured to identify at least one triangle from the garment mesh and at least one triangle from the intermediate body mesh that are potentially in collision;

a narrow phase collision handling SW module 130d that is configured to detect and resolve at least one potential collision between the garment mesh and itself and/or at least one potential collision between the garment mesh and the intermediate body mesh. The narrow phase collision handling SW module 130d may also detect and resolve at least one actual collision between the garment mesh and itself and/or at least one actual collision between the garment mesh and the intermediate body mesh; and a simulation convergence SW module that is configured to determine whether the garment fitting simulation has come to a rest state.

As discussed above, computing device 120 may receive from user interface 110, a garment mesh, a destination body mesh, a source body mesh, and one or more environmental object meshes. For example, a user may import one or more of these meshes from an external device (not shown) such as a camera, video recorder, or 3D scanner via the user interface 110. Alternatively, or in addition to, the user may define one or more of these meshes using digital authoring tools for 3D illustration (not shown), store them (not shown) in memory 130, and provide access to the defined meshes to the processor 140 via user interface 110. Still further, the user may download one or more of these meshes from the internet to memory 130 via the network interface 160 and provide access to the downloaded meshes for use with the garment fitting simulation via user interface 110.

Upon receiving the meshes (or access thereto) as described above, processor 140 may execute each of the above SW modules at each time interval over one or more time intervals in order to simulate the fitting of the garment mesh to the destination body mesh until the simulation has come to a rest state (as described below). Processor 140 may execute motion simulation SW module 130a in order to simulate the motion of the garment and body meshes over one or more time intervals. Processor 140 may simulate the motion of the garment mesh based on the material properties of the garment mesh and at least one external parameter. Simultaneously, processor 140 may perform a linear interpolation between the source and destination body meshes over the one or more time intervals, thereby generating an intermediate body mesh at each time interval of the simulation. Stated differently, the motion of the intermediate body mesh may correspond to the position of the source body mesh at each individual time interval as it transitions into the destination body mesh that the garment mesh is to be fitted on.

In some embodiments, processor 140 may utilize a fast semi-integrator algorithm to predict the unconstrained motion of the garment mesh based on the material properties of the garment mesh and external parameters. Processor 140 may integrate at least one external parameter to determine the velocity and position of each vertex of the garment mesh. Examples of external parameters may include gravity, air resistance, friction, damping, and collision response. As discussed above, processor 140 performs a linear interpolation between the source and destination body meshes in order to simulate the motion of the intermediate body mesh. The linear interpolation process relies on a predefined offset value which determines the maximal movement of a vertex in a time step. Stated differently, any one vertex of a body mesh cannot be moved over the maximal value in a time step. Based on this predefined value, processor 140 may compute the required time steps to transform the source body mesh to the destination body mesh under a given time-step size. In order to smooth the intermediate body mesh animation process, processor 140 may choose the vertex in a body mesh which has the maximal Euclidean distance between its source position and destination position to calculate the amount of time steps required for intermediate body mesh transformation or animation such as follows:

Assume $Dist_{MaximalOffset}=0.1$, and
$Dist_{Maximal\ Euclidean}=|V_{source}-V_{destination}|=5.0$.

Then the amount of time step=(Maximal Euclidean Dist/$Dist_{MaximalOffset}$)=(5.0/0.1)=50. Eventually, for an intermediate body mesh in the 10th time interval, processor 140 may determine the vertex position as $V_{intermediate}=V_{source}+(V_{destination}-V_{source})*10/50$.

Figure 3A:
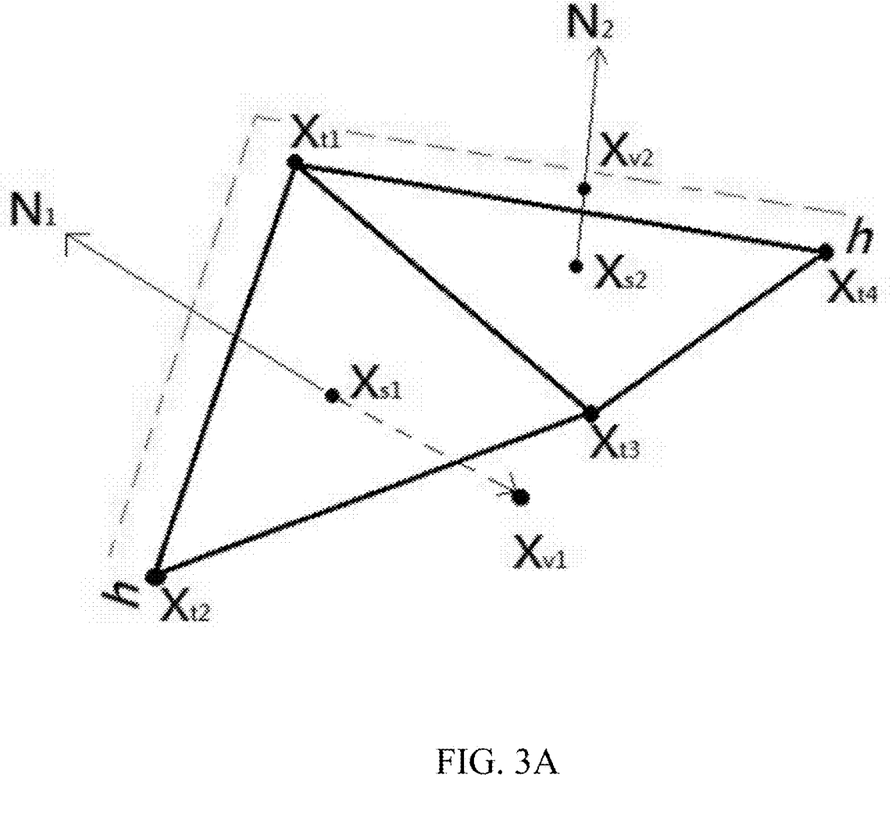
FIG. 3A is a perspective view of an exemplary collision between triangles of different objects in accordance with some embodiments of the present disclosure.

In some embodiments, processor 140 may execute the static collision handling SW module 130b in order to detect and resolve at least one collision between the garment mesh and at least one environmental object mesh. For example, processor 140 may detect each instance when a vertex or edge of the garment mesh is located in the minus-normal direction of the closest triangle of at least one environmental object mesh and/or each instance when a vertex or edge of the garment mesh is within a threshold proximity of the closest triangle of at least one environmental object mesh. FIG. 3A illustrates both scenarios of collision between a vertex of a garment mesh, and one or more triangles of an environmental object mesh. As illustrated in FIG. 3A, H is the threshold proximity (represented here as the height above the face of the triangles), Xv1 and Xv2 are a vertices of the garment mesh (not shown), Xs1 is the point on the triangle face (for the triangle made up of Xt1, Xt2, and Xt3) that is closest to the vertex Xv1, and N1 may be referred to as the triangle normal vector (representing the direction of the collision). Xs2 is the point on the triangle face (for the triangle made up of Xt3, Xt4, and Xt5) that is closest to the vertex Xv2, and N2 may be referred to as the triangle normal vector (representing the direction of the collision). As can be seen, vertex Xv1 lies in the minus normal direction (i.e. vertex Xv1 has pierced the face of the triangle made up of Xt1, Xt2, and Xt3) and is therefore in collision with the triangle. In addition, Xv2 is within the threshold proximity H of the triangle made up of Xt3, Xt4, and Xt5, and is therefore also in collision. For each detected collision, processor 140 may project the garment mesh vertex involved in the collision by a correction offset along the plus-normal direction until the vertex is no longer in collision (i.e. is outside the threshold proximity) with the triangle. Processor 140 may determine the correction offset as:

$$\Delta x_v = h - (x_v - x_s) \cdot n_s = h - (x_v - x_s) \cdot \frac{(x_{t3} - x_{t1}) \times (x_{t2} - x_{t1})}{|(x_{t3} - x_{t1}) \times (x_{t2} - x_{t1})|}.$$

Referring back to FIG. 1, in an embodiment, processor 140 may utilize a Gauss-Seidel constraint solver algorithm in order to determine the correction offset for the vertex as well as the direction of the collision. Upon determining the appropriate correction offset for the at least one collision between the garment mesh and the at least one environmental object mesh, processor 140 may then project the vertex of the garment mesh involved in the at least one collision by its calculated correction offset along the plus-normal direction (as calculated by processor 140).

In this manner, processor 140 may iteratively resolve each detected collision between the garment mesh and the at least one environmental object mesh. In another embodiment, the processor 140 may accelerate the constraint solving process by using a parallelized constraint solving algorithm. Processor 140 may partition each detected collision into groups based on the proximity of the garment mesh vertex and the environmental object mesh triangle involved in each collision and resolve every single collision in a group independently in parallel. In some embodiments, processor 140 may average the correction offsets of a group, and modify each calculated correction offset for that group based on the averaged offset.

In some embodiments, processor 140 may execute the broad phase complex collision handling SW module 130c in order to identify triangles from the intermediate body mesh and the garment mesh that are not potentially in collision and disregard them for the purposes of collision detection. By removing from consideration those triangles that are not potentially in collision, processor 140 may avoid performing unnecessary computationally expensive collision resolution operations associated with collisions between the garment mesh and the intermediate body mesh, the garment mesh and other garment meshes (if any), and/or between the garment mesh and itself. For example, processor 140 may identify triangles of the garment mesh that are at or beyond a predefined potential collision proximity from any other triangle of the garment mesh and/or the intermediate body mesh. In an embodiment, processor 140 may utilize a bounding volume hierarchy (BVH) tree, as is known in the art, in order to identify and eliminate triangles that are not potentially in collision. For example, processor 140 may utilize a two level BVH tree based on the topology of the garment mesh and the intermediate mesh and may select as a bounding volume, any simple shape such as a sphere, axis aligned bounding box (AABB), capsule, or k-DOP, among others. In an embodiment, processor 140 may take into account certain internal factors such as the thickness of the garment in selecting a bounding volume. In the upper level, processor 140 may construct a bounding volume (sub-node) for each object in the simulation. For every two neighboring sub-nodes, processor 140 may recursively build a parent node and a corresponding bounding volume that is big enough to contain both its direct child nodes. Processor 140 may continue in this fashion until a root node covering all of the nodes is generated. For the lower level, processor 140 may use a "top down" approach and construct a bounding volume to encompass every triangle in an object and then divide the object into a set of sub-meshes to build internal nodes. Once the BVH tree is established, processor 140 may identify triangle pairs having triangles that are beyond the potential collision threshold proximity as well as triangle pairs having triangles that are within the potential collision threshold proximity of each other. More specifically, processor 140 may traverse down the two-level BVH tree to perform bounding-volume overlap tests between sub nodes. If both sub-nodes are overlapping, we further pair their child nodes to do next overlap test until the leaf nodes are reached and paired to generate overlapping triangle pairs. Further details regarding bounding volume trees may be found in "MCCD: Multi-core collision detection between deformable models using front-based decomposition" by TANG, M., MANOCHA, D., AND TONG, R. 2010 Graphical Models 72, 2, 7-23, which is incorporated by reference herein. By identifying and eliminating triangle pairs that are not potentially in collision, processor 140 may conserve computing and simulation resources of computing device 120.

In some embodiments, processor 140 may execute narrow phase complex collision handling SW module 130d in order to resolve potential and actual collisions between the garment mesh and the intermediate body mesh, the garment mesh and other garment meshes (if any), and/or between the garment mesh and itself. For each triangle pair that are within the potential collision proximity threshold of each other, processor 140 may determine which of those pairs include triangles that are approaching each other and identify such pairs as potential collisions. In an embodiment, processor 140 may determine triangle pairs that are potential collisions by querying the BVH tree as discussed above. Processor 140 may determine which pairs include triangles that are approaching each other based on the relative velocity in the normal direction of each triangle in the pair. Processor 140 may apply an inelastic repulsive force to each triangle pair identified as a potential collision. Processor 140 may utilize any appropriate algorithm in order to perform the proximity detection and determine appropriate repulsive forces for each triangle pair that is a potential collision. For example, in an embodiment, processor 140 may utilize the Bridson proximity checking algorithm proposed by Robert Bridson, and detailed in "Robust Treatment of Collisions, Contact and Friction for Cloth Animation," The Association for Computing Machinery Inc., 2002, which is incorporated herein by reference. In this way, processor 140 may further decrease the number of subsequent processor intensive actual collision handling processes that must be carried out.

Figure 3B:
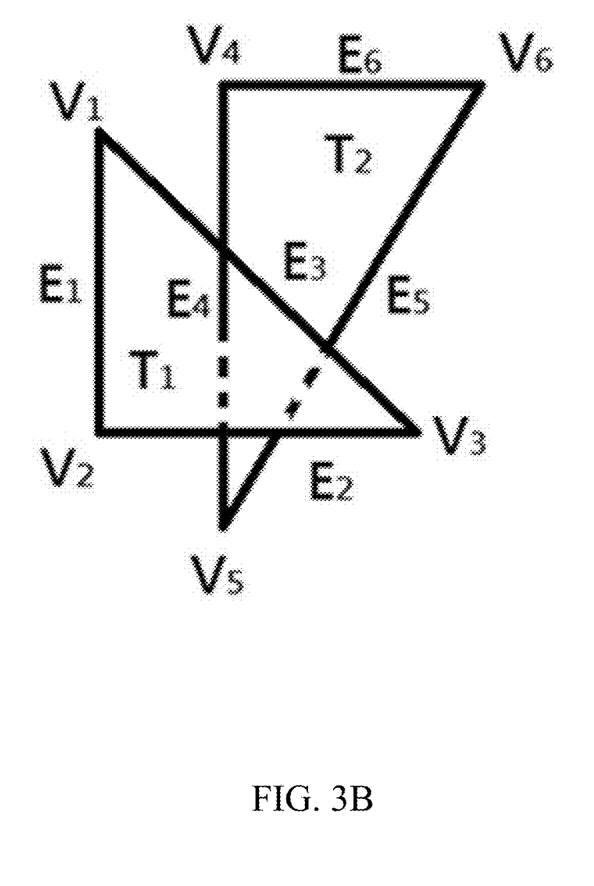
FIG. 3B is a perspective view of different potential collision pairs between triangles of different objects in accordance with some embodiments of the present disclosure.

In some embodiments, processor 140 may detect at least one actual collision between the garment mesh and the intermediate body mesh, the garment mesh and other garment meshes (if any), and/or between the garment mesh and itself. More specifically, processor 140 may detect each instance when a vertex or edge of the garment mesh is located in the minus-normal direction of the closest triangle of the intermediate body mesh or the garment mesh itself, and/or each instance when a vertex or edge of the garment mesh is within the threshold proximity of the closest triangle of the intermediate body mesh or the garment mesh itself. In other words, referring to FIG. 3B, processor 140 may divide each potential triangle-triangle collision pair into 6 vertex-triangle pairs (V1-T2, V2-T2, V3-T3, V4-T1, V5-T1, and V6-T1) and 9 edge-edge collision pairs (E1-E4, E1-E5, E1-E6, E2-E4, E2-E5, E2-E6, E3-E4, E3-E5, and E3-E6) respectively. Processor 140 may determine whether any of these 15 pairs are colliding with each other. Referring back to FIG. 1, processor 140 may utilize an accurate fail-safe collision detection algorithm to determine the contact time and the contact normal (contact direction) for the vertex-triangle or edge-edge pair (hereinafter the "collision pair") involved in the at least one actual collision. Fail-safe collision detection refers to the correct detection of all actual collisions with minimal computation, and processor 140 may utilize any suitable algorithm for performing such fail-safe collision detection. For example, processor 140 may utilize the continuous collision detection (CCD) proposed by Suejung Huh and detailed in Dreamworks Animation Technical Report 2014-320 entitled "Fast and Robust Continuous Collision Detection," which is incorporated herein by reference. Based on the contact time and contact normal of the at least one actual collision, processor 140 computes a restitution impulse and a direction thereof, and applies the computed restitution impulse to the collision pair involved in the at least one actual collision.

The use of CCD may not eliminate all of the detected actual collisions, and therefore execution of the narrow phase complex collision handling SW module 130d also causes processor 140 to perform an additional step of impact zone resolution, to resolve any remaining actual collisions between the garment mesh and the intermediate body mesh, the garment mesh and other garment meshes (if any), and/or between the garment mesh and itself. Processor 140 may treat all remaining collision pairs simultaneously and iteratively solve a set of inelastic projections on the vertex velocity to push the collision pair apart, while also preventing the collision pair from approaching further. Processor 140 may use any suitable algorithm, such as the Harmon impact zone resolution algorithm, proposed by Robert Harmon et al. and detailed in "Robust Treatment of Simultaneous Collisions," which is incorporated herein by reference. The impact zone approach serves to solve any remaining actual collisions while preserving as much tangential motion as possible.

In some embodiments, processor 140 may execute the simulation convergence SW module 130e to determine if the simulation has come to a rest state and if the source body mesh has been fully interpolated into the destination body mesh. The rest state occurs when the motion of the garment mesh has slowed down to a level that such motion can be ignored visually. Processor 140 determines whether the velocity of the garment mesh is below a predefined velocity threshold and whether the garment mesh's duration time exceeds a heuristic time such that the simulation's convergence is not affected. Each vertex of the garment mesh may have its own velocity, thus processor 140 may assume the velocity of the garment mesh to be the average velocity among all of its vertices when determining if the garment mesh's velocity is below the predefined velocity threshold. Processor 140 may maintain two kinds of vertex position buffers to represent the vertex positions of a mesh at the beginning of a time-step and the end of a time-step respectively. Processor 140 may replicate the position buffer of both garment and body meshes at the end of a time step to the position buffer at the beginning of a time step, while the simulation has not reached the rest state and needs to perform the next time-step's simulation. Processor 140 may utilize the beginning position buffer to check potential collision pairs and compute the contact time and normal using CCD, for example.

If processor 140 determines that the velocity of the garment mesh is not below the predefined velocity threshold, then processor 140 may advance the simulation to the next time interval and continue simulating the motion of the garment and intermediate body meshes based on each object's vertex positions and each object's velocity at the end of the previous simulation interval. Similarly, if processor 140 determines that the source body mesh is not fully interpolated, then processor 140 may advance the simulation to the next time interval and continue simulating the motion of the garment and intermediate body meshes based on each object's vertex positions and each object's velocity at the end of the previous simulation interval.

If, however, processor 140 does determine that the velocity of the garment mesh is below the predefined velocity threshold, and that the source body mesh is fully interpolated, then it may end the simulation and display the result of the fitting to a user via display 150.

The amount of time required to reach convergence is based, at least in part, on the difference between the source and destination body meshes. The smaller the amount of geometric difference between the source and destination body meshes, the faster the simulation may reach convergence (i.e. come to the rest state). Thus, garment and source body meshes that are a close geometric match for a destination body mesh input by a user may be cached prior to simulation. Details for such caching are discussed more fully in U.S. patent application Ser. No. 15/806,269 entitled SYSTEMS AND METHODS FOR REDUCING THE SIMULATION TIME OF PHYSICS BASED GARMENT SIMULATIONS filed on Nov. 7, 2017, which is incorporated herein by reference in its entirety.

Figure 4:
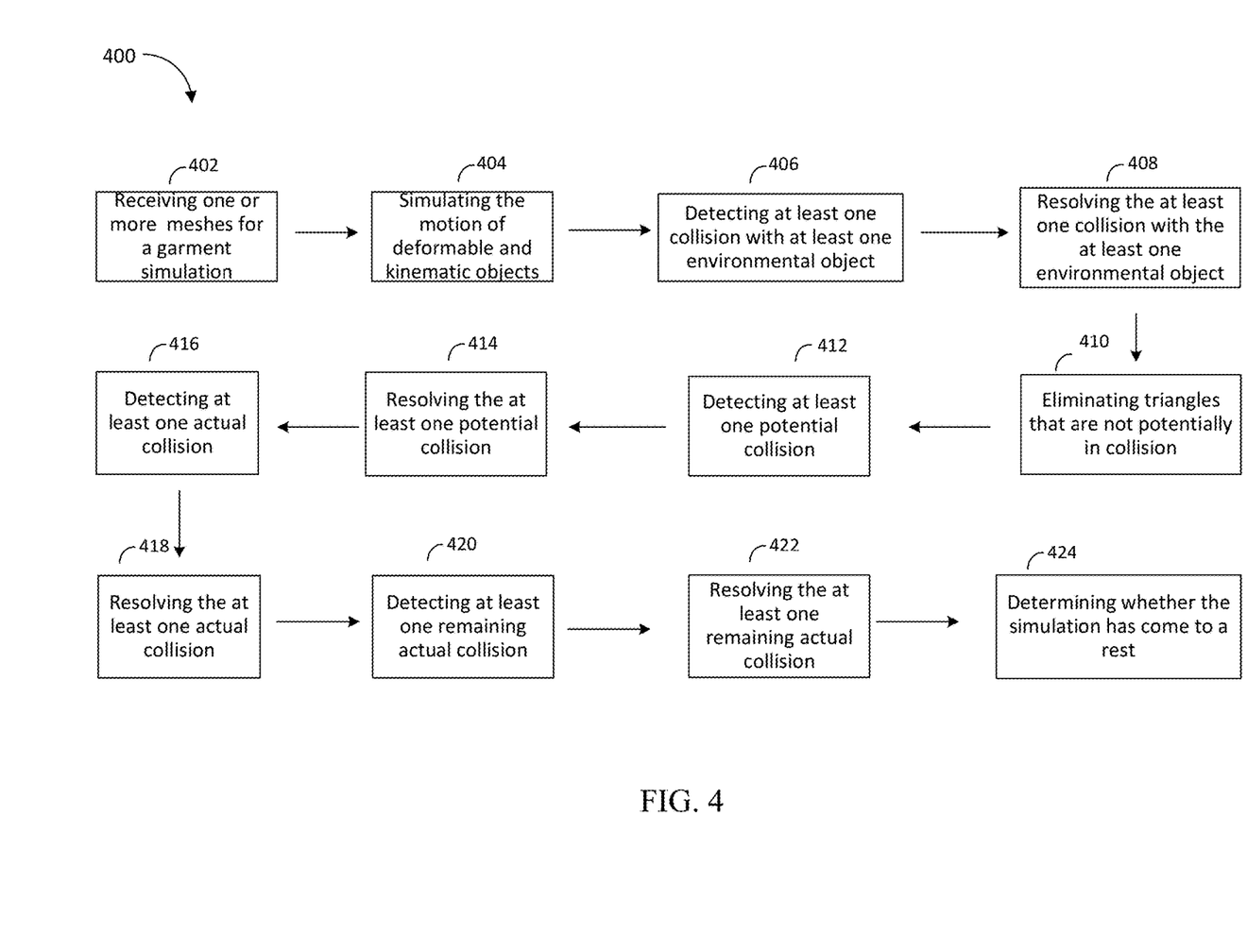
FIG. 4 is a flow diagram of an exemplary method for simulating the fitting of a garment using the system shown in FIG. 1, in accordance with some embodiments of the present disclosure.

FIG. 4 is a flow diagram 400 of an exemplary method for simulating a garment fitting, using system 100 (shown in FIG. 1).

At 402, computing device 120 may receive from user interface 110, a garment mesh, a destination body mesh, a source body mesh, and one or more environmental object meshes. For example, a user may import one or more of these meshes from an external device (not shown) such as a camera, video recorder, or 3D scanner via the user interface 110. Alternatively, or in addition to, the user may define one or more of these meshes using digital authoring tools for 3D illustration (not shown), store them (not shown) in memory 130, and provide access to the defined meshes to the processor 140 via user interface 110. Still further, the user may download one or more of these meshes from the internet to memory 130 via the network interface 160 and provide access to the downloaded meshes for use with the garment fitting simulation via user interface 110.

At 404, upon receiving the meshes (or access thereto) as described above, processor 140 may simulate the motion of the garment and body meshes over one or more time intervals until the simulation has come to rest (as discussed below). Processor 140 may simulate the motion of the garment mesh based on the material properties of the garment mesh and at least one external parameter. Simultaneously, processor 140 may perform a linear interpolation between the source and destination body meshes over the one or more time intervals, thereby generating an intermediate body mesh at each time interval of the simulation. Stated differently, the motion of the intermediate body mesh may correspond to the position of the source body mesh at each individual time interval as it transitions into the destination body mesh that the garment mesh is to be fitted on.

Processor 140 may utilize a fast semi-integrator algorithm to predict the unconstrained motion of the garment mesh based on the material properties of the garment mesh and external parameters. Processor 140 may integrate at least one external parameter to determine the velocity and position of each vertex of the garment mesh. Examples of external parameters may include gravity, air resistance, friction, damping, and collision response. As discussed above, processor 140 performs a linear interpolation between the source and destination body meshes in order to simulate the motion of the intermediate body mesh. The linear interpolation process relies on a predefined offset value which determines the maximal movement of a vertex in a time step. Stated differently, any one vertex of a body mesh cannot be moved over the maximal value in a time step. Based on this predefined value, processor 140 may compute the required time steps to transform the source body mesh to the destination body mesh under a given time-step size. In order to smooth the intermediate body mesh animation process, processor 140 may choose the vertex in a body mesh which has the maximal Euclidean distance between its source position and destination position to calculate the amount of time steps required for intermediate body mesh transformation or animation such as follows:

Assume $Dist_{MaximalOffset}=0.1$, and
$Dist_{Maximal\ Euclidean}=|V_{source}-V_{destination}|=5.0$.

Then the amount of time step=(Maximal Euclidean Dist/ $\text{Dist}_{MaximalOffset}$)=(5.0/0.1)=50. Eventually, for an intermediate body mesh in the 10th time interval, the vertex position will be determined as $V_{intermediate}=V_{source}+(V_{destination}-V_{source})*10/50$.

At 406, processor 140 may detect at least one collision between the garment mesh and at least one environmental object mesh. More specifically, processor 140 may detect each instance when a vertex or edge of the garment mesh is located in the minus-normal direction of the closest triangle of at least one environmental object mesh and/or each instance when a vertex or edge of the garment mesh is within a threshold proximity of the closest triangle of at least one environmental object mesh. At 408, for each detected collision, processor 140 may project the garment mesh vertex involved in the collision by a correction offset along the plus-normal direction until the vertex is no longer in collision (i.e. is outside the threshold proximity) with the triangle. Processor 140 may determine the correction offset as described above with respect to FIG. 3A. Upon determining the appropriate correction offset for the at least one collision between the garment mesh and the at least one environmental object mesh, processor 140 may then project the vertex of the garment mesh involved in the at least one collision by its calculated correction offset along the plus-normal direction (as calculated by processor 140).

In an embodiment, processor 140 may utilize a Gauss-Seidel constraint solver algorithm in order to determine the correction offset for the vertex as well as the direction of the collision. In this manner, processor 140 may iteratively resolve each detected collision between the garment mesh and the at least one environmental object mesh. In another embodiment, the processor 140 may accelerate the constraint solving process by using a parallelized constraint solving algorithm. Processor 140 may partition each detected collision into groups based on the proximity of the garment mesh vertex and the environmental object mesh triangle involved in each collision and resolve every single collision in a group independently in parallel. In some embodiments, processor 140 may average the correction offsets of a group, and modify the each calculated correction offset for that group with the averaged offset.

At 410, processor 140 may identify triangles from the intermediate body mesh and the garment mesh that are not potentially in collision and disregard them for the purposes of collision detection. By removing from consideration those triangles that are not potentially in collision, processor 140 may avoid performing unnecessary computationally expensive collision resolution operations associated with collisions between the garment mesh and the intermediate body mesh, the garment mesh and other garment meshes (if any), and/or between the garment mesh and itself. For example, processor 140 may utilize a two level BVH tree based on the topology of the garment mesh and the intermediate mesh and may select as a bounding volume, any simple shape such as a sphere, axis aligned bounding box (AABB), capsule, or k-DOP, among others. In an embodiment, processor 140 may take into account certain internal factors such as the thickness of the garment in selecting a bounding volume. In the upper level, processor 140 may construct a bounding volume (sub-node) for each object in the simulation. For every two neighboring sub-nodes, processor 140 may recursively build a parent node and a corresponding bounding volume that is big enough to contain both its direct child nodes. Processor 140 may continue in this fashion until a root node covering all of the nodes is generated. For the lower level, processor 140 may use a "top down" approach and construct a bounding volume to encompass every triangle in an object and then divide the object into a set of sub-meshes to build internal nodes. Once the BVH tree is established, processor 140 may identify triangle pairs having triangles that are beyond the potential collision threshold proximity as well as triangle pairs having triangles that are within the potential collision threshold proximity of each other. More specifically, processor 140 may traverse down the two-level BVH tree to perform bounding-volume overlap tests between sub nodes. If both sub-nodes are overlapping, we further pair their child nodes to do next overlap test until the leaf nodes are reached and paired to generate overlapping triangle pairs. Further details regarding bounding volume trees may be found in "MCCD: Multi-core collision detection between deformable models using front-based decomposition" by TANG, M., MANOCHA, D., AND TONG, R. 2010 Graphical Models 72, 2, 7-23, which is incorporated by reference herein. By identifying and eliminating triangle pairs that are not potentially in collision, processor 140 may conserve computing and simulation resources of computing device 120.

At 412, processor 140 may detect at least one potential collision between the garment mesh and the intermediate body mesh, the garment mesh and other garment meshes (if any), and/or between the garment mesh and itself. For each triangle pair having triangles that are within the potential collision proximity threshold of each other, processor 140 may determine which of those pairs include triangles that are approaching each other and identify such pairs as potential collisions. In an embodiment, processor 140 may determine triangle pairs that are potential collisions by querying the BVH tree as discussed above. Processor 140 may determine which pairs include triangles that are approaching each other based on the relative velocity in the normal direction of each triangle in the pair. At 414, processor 140 may then apply an inelastic repulsive force to each triangle pair identified as a potential collision. Processor 140 may utilize any appropriate algorithm in order to perform the proximity detection and determine appropriate repulsive forces for each triangle pair that is a potential collision. For example, in an embodiment, processor 140 may utilize the Bridson proximity checking algorithm proposed by Robert Bridson, and detailed in "Robust Treatment of Collisions, Contact and Friction for Cloth Animation," The Association for Computing Machinery Inc., 2002, which is incorporated herein by reference. In this way, processor 140 may further decrease the number of subsequent processor intensive actual collision handling processes that must be carried out.

At 416, processor 140 may detect at least one actual collision between the garment mesh and the intermediate body mesh, the garment mesh and other garment meshes (if any), and/or between the garment mesh and itself. More specifically, processor 140 may detect each instance when a vertex or edge of the garment mesh is located in the minus-normal direction of the closest triangle of the intermediate body mesh or the garment mesh itself, and/or each instance when a vertex or edge of the garment mesh is within the threshold proximity of the closest triangle of the intermediate body mesh or the garment mesh itself. In other words, referring to FIG. 3B, processor 140 may divide each potential triangle-triangle collision pair into 6 vertex-triangle pairs (V1-T2, V2-T2, V3-T3, V4-T1, V5-T1, and V6-T1) and 9 edge-edge collision pairs (E1-E4, E1-E5, E1-E6, E2-E4, E2-E5, E2-E6, E3-E4, E3-E5, and E3-E6) respectively. Processor 140 may determine whether any of these 15 pairs are colliding with each other. At 418, processor 140 may resolve the at least one actual collision.

Referring back to FIG. 1, processor 140 may utilize an accurate fail-safe collision detection algorithm to determine the contact time and the contact normal (contact direction) for the vertex-triangle or edge-edge pair (hereinafter the "collision pair") involved in the at least one actual collision. Fail-safe collision detection refers to the correct detection of all actual collisions with minimal computation, and processor 140 may utilize any suitable algorithm for performing such fail-safe collision detection. For example, processor 140 may utilize the continuous collision detection (CCD) proposed by Suejung Huh and detailed in Dreamworks Animation Technical Report 2014-320 entitled "Fast and Robust Continuous Collision Detection," which is incorporated herein by reference. Based on the contact time and contact normal of the at least one actual collision, processor 140 computes a restitution impulse and a direction thereof, and applies the computed restitution impulse to the collision pair involved in the at least one actual collision.

The use of CCD may not eliminate all of the detected actual collisions, and therefore, at 420, processor 140 may detect at least one remaining actual collision. At 422, processor 140 performs an additional step of impact zone resolution, to resolve any remaining actual collisions between the garment mesh and the intermediate body mesh, the garment mesh and other garment meshes (if any), and/or between the garment mesh and itself. Processor 140 may treat all remaining collision pairs simultaneously and iteratively solve a set of inelastic projections on the vertex velocity to push the collision pair apart, while also preventing the collision pair from approaching further. Processor 140 may use any suitable algorithm, such as the Harmon impact zone resolution algorithm, proposed by Robert Harmon et al. and detailed in "Robust Treatment of Simultaneous Collisions," which is incorporated herein by reference. The impact zone approach serves to solve any remaining actual collisions while preserving as much tangential motion as possible.

At 424, processor 140 determines if the simulation has come to a rest state and if the source body mesh has been fully interpolated into the destination body mesh. The rest state occurs when the motion of the garment mesh has slowed down to a level that such motion can be ignored visually. Processor 140 determines whether the velocity of the garment mesh is below a predefined velocity threshold and whether the garment mesh's duration time exceeds a heuristic time such that the simulation's convergence is not affected. Each vertex of the garment mesh may have its own velocity, thus processor 140 may assume the velocity of the garment mesh to be the average velocity among all of its vertices when determining if the garment mesh's velocity is below the predefined velocity threshold. Processor 140 may maintain two kinds of vertex position buffers to represent the vertex positions of a mesh at the beginning of a time-step and the end of a time-step respectively. Processor 140 may replicate the position buffer of both garment and body meshes at the end of a time step to the position buffer at the beginning of a time step, while the simulation has not reached the rest state and needs to perform the next time-step's simulation. Processor 140 may utilize the beginning position buffer to check potential collision pairs and compute the contact time and normal in CCD, for example.

If processor 140 determines that the velocity of the garment mesh is not below the predefined velocity threshold, then processor 140 may advance the simulation to the next time interval and continue simulating the motion of the garment and intermediate body meshes based on each object's vertex positions and each object's velocity at the end of the previous simulation interval. Similarly, if processor 140 determines that the source body mesh is not fully interpolated, then processor 140 may advance the simulation to the next time interval and continue simulating the motion of the garment and intermediate body meshes based on each object's vertex positions and each object's velocity at the end of the previous simulation interval.

If, however, processor 140 does determine that the velocity of the garment mesh is below the predefined velocity threshold, and that the source body mesh is fully interpolated, then it may end the simulation and display the result of the fitting to a user via display 150.

The amount of time required to reach convergence is based, at least in part, on the difference between the source and destination body meshes. The smaller the amount of geometric difference between the source and destination body meshes, the faster the simulation may reach convergence (i.e. come to the rest state). Thus, garment and source body meshes that are a close geometric match for a destination body mesh input by a user may be cached prior to simulation. Details for such caching are discussed more fully in U.S. patent application Ser. No. 15/806,269 entitled SYSTEMS AND METHODS FOR REDUCING THE SIMULATION TIME OF PHYSICS BASED GARMENT SIMULATIONS filed on Nov. 7, 2017, which is incorporated herein by reference in its entirety.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. The computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for simulating the fitting of a deformable object over one or more time intervals, the method comprising:
   at each time interval:
      simulating the deformable object's motion based on at least one material property for the deformable object and at least one external parameter, wherein the deformable object is represented as a polygonal mesh;
      detecting at least one collision between the deformable object and at least one environmental object, wherein the at least one environmental object is represented as a polygonal mesh;
      resolving the at least one collision between the deformable object and the at least one environmental object;
      detecting at least one potential collision between the deformable object and at least one kinematic object, and applying a repulsive force to the at least one potential collision, wherein the at least one kinematic object is represented as a polygonal mesh;
      detecting at least one actual collision between the deformable object and the at least one kinematic object and applying a restitution impulse to the at least one actual collision;
      detecting at least one remaining actual collision and resolving the remaining at least one actual collision; and
      determining whether the simulation of the deformable object's motion has come to a rest state based on a velocity of the deformable object.

2. The method of claim 1, further comprising performing no further simulations when the deformable object's motion is determined as coming to the rest state.

3. The method of claim 1, wherein resolving the at least one collision comprises projecting at least one vertex of the deformable object that is involved in the collision along a direction of the collision to a nearest non-penetrating position.

4. The method of claim 1, wherein detecting the at least one collision between the deformable object and the at least one environmental object comprises detecting that at least one vertex of the deformable object is within a threshold proximity of at least one polygon of the at least one environmental object.

5. The method of claim 1, wherein detecting the at least one potential collision comprises identifying at least one polygon of the deformable object and at least one polygon of the one or more kinematic objects that are within a potential collision proximity of each other and are approaching each other.

6. The method of claim 1, further comprising:
   prior to detecting the one or more potential collisions between the deformable object and the one or more kinematic objects, identifying at least one polygon of the deformable object and at least one polygon from the one or more kinematic objects that are not potentially in collision with any other polygon of the deformable object or any other polygons of the one or more kinematic objects and removing them from the simulation.

7. The method of claim 1, wherein resolving the at least one remaining actual collision comprises applying an inelastic projection to a vertex of the deformable object that is involved in the collision to separate the collision pair and prevent the collision pair from approaching further.

8. The method of claim 1, wherein the restitution impulse and a direction thereof are determined based on the contact time and contact normal of the actual collision.

9. The method of claim 1, wherein determining whether the simulation has come to rest comprises determining whether a velocity of the deformable object is less than a predefined threshold.

10. A non-transitory computer readable medium having instructions stored thereon for simulating the fitting of a deformable object over one or more time intervals, wherein the instructions, when executed by a processor cause a device to perform operations comprising:
   at each time interval:
      simulating the deformable object's motion based on at least one material property for the deformable object and at least one external parameter, wherein the deformable object is represented as a polygonal mesh;
      detecting at least one collision between the deformable object and at least one environmental object, wherein the at least one environmental object is represented as a polygonal mesh;
      resolving the at least one collision between the deformable object and the at least one environmental object;
      detecting at least one potential collision between the deformable object and at least one kinematic object, and applying a repulsive force to the at least one potential collision, wherein the at least one kinematic object is represented as a polygonal mesh;
      detecting at least one actual collision between the deformable object and the at least one kinematic object and applying a restitution impulse to the at least one actual collision;
      detecting at least one remaining actual collision and resolving the remaining at least one actual collision; and determining whether the simulation of the deformable object's motion has come to a rest based on a velocity of the deformable object.

11. The non-transitory storage medium of claim 10, wherein execution of the instructions further causes the device to perform no further simulations when the deformable object's motion is determined as coming to the rest.

12. The non-transitory storage medium of claim 10, wherein detecting the at least one potential collision comprises identifying at least one polygon of the deformable object and at least one polygon of the one or more kinematic objects that are within a potential collision threshold proximity of each other.

13. The non-transitory storage medium of claim 10, wherein execution of the instructions further causes the device to:
   prior to detecting the one or more potential collisions between the deformable object and the one or more kinematic objects, identifying at least one polygon of the deformable object and at least one polygon from the one or more kinematic objects that are not potentially in collision with any other polygons of the deformable object or any other polygons of the one or more kinematic objects.

14. The non-transitory storage medium of claim 10, wherein determining whether the simulation has come to rest comprises determining whether a velocity of the deformable object is less than a predefined velocity threshold.

15. A system for simulating the fitting of a deformable object over one or more time intervals, the system comprising:
   a computing device configured to:
   at each time interval:
      simulate the deformable object's motion based on at least one material property for the deformable object and at least one external parameter, wherein the deformable object is represented as a polygonal mesh;
      detecting at least one collision between the deformable object and at least one environmental object, wherein the at least one environmental object is represented as a polygonal mesh;
      resolving the at least one collision between the deformable object and the at least one environmental object;
      detecting at least one potential collision between the deformable object and at least one kinematic object, and applying a repulsive force to the at least one potential collision, wherein the at least one kinematic object is represented as a polygonal mesh;
      detecting at least one actual collision between the deformable object and the at least one kinematic object and applying a restitution impulse to the at least one actual collision;
      detecting at least one remaining actual collision and resolving the remaining at least one actual collision; and
      determining whether the simulation of the deformable object's motion has come to a rest based on a velocity of the deformable object.

16. The system of claim 15, wherein the computing device is further configured to perform no further simulations when the deformable object's motion is determined as coming to the rest.

17. The system of claim 15, wherein resolving the at least one collision comprises projecting at least one vertex involved in the collision along a direction of the collision to a nearest non-penetrating position.

18. The system of claim 15, wherein the computing device is further configured to:
   prior to detecting the one or more potential collisions between the deformable object and the one or more kinematic objects, identifying at least one vertex of the deformable object and at least one polygon from the one or more kinematic objects that are not potentially in collision with any other vertex of the deformable object or any other polygons of the one or more kinematic objects.

19. The system of claim 15, wherein detecting the at least one potential collision comprises identifying at least one polygon of the deformable object and at least one polygon of the one or more kinematic objects that are within a potential collision threshold proximity of each other.

20. The system of claim 15, wherein determining whether the simulation has come to rest comprises determining whether a velocity of the deformable object is less than a predefined velocity threshold.

* * * * *